United States Patent [19]
Payne et al.

[11] Patent Number: 6,091,506
[45] Date of Patent: Jul. 18, 2000

[54] EMBEDDED DISPLAY LIST INTERPRETER WITH DISTRIBUTION OF RENDERING TASKS, FOR MULTIPROCESSOR-BASED PRINTER

[75] Inventors: Ralph E. Payne, Dallas, Tex.; Praveen K. Ganapathy; Srinivasan Ramachandran, both of Karnataka, India

[73] Assignee: Texas Instruments Incorporated, Dallas, Tex.

[21] Appl. No.: 08/957,475

[22] Filed: Oct. 24, 1997

[30] Foreign Application Priority Data

Oct. 25, 1996 [IN] India .................. 1872MAS1996

[51] Int. Cl.[7] ............................................ G06F 15/16
[52] U.S. Cl. .................. 358/1.14; 358/1.12; 345/504; 345/505; 345/522
[58] Field of Search ...................... 395/112, 114, 395/115, 116; 382/304; 358/1.12, 1.14, 1.15, 1.16; 345/504, 505, 522

[56] References Cited

U.S. PATENT DOCUMENTS

| | | | |
|---|---|---|---|
| 4,949,280 | 8/1990 | Littlefield | 364/518 |
| 5,768,489 | 6/1998 | Adachi et al. | 395/117 |
| 5,809,288 | 9/1998 | Balmer | 395/553 |
| 5,859,958 | 1/1999 | Chan et al. | 395/117 |

*Primary Examiner*—Mark K. Zimmerman
*Assistant Examiner*—Lance W. Sealey
*Attorney, Agent, or Firm*—Charles A. Brill; Wade James Brady, III; Frederick J. Telecky, Jr.

[57] ABSTRACT

A processing unit (11) for a printer system. The processing unit (11) is comprised of a master processor (21) and multiple parallel processors (22). The master processor (21) builds a display list and partitions it into sublists, which it distributes to the parallel processors (22). The parallel processors (22) interpret the sublists, thereby rendering the image as bitmapped data. Interpretation of a sublist is performed by reading its operation codes and calling rasterizing primitives represented by the operation codes. (FIG. 3). During execution of a rasterizing primitive, a parallel processor (22) determines whether the next operation code in the sublist will call the same primitive. If so, execution of the current primitive is repeated.

16 Claims, 3 Drawing Sheets

EMBEDDED DISPLAY LIST INTERPRETER WITH DISTRIBUTION OF RENDERING TASKS, FOR MULTIPROCESSOR-BASED PRINTER

TECHNICAL FIELD OF THE INVENTION

This invention relates generally to electrophotographic printing, and more particularly to a method of processing a display list representing an image, such that the image is rendered as bitmapped data.

RELATED PATENT APPLICATIONS

This patent application is related to the following patent applications, each assigned to Texas Instruments Incorporated:

U.S. patent application Ser. No. 60/024,795, entitled "Embedded Display List Interpreter for Multiprocessor-Based Printer"; U.S. patent application Ser. No. 08/951,021, entitled "Pattern Filling for Processor-Based Printer"; U.S. patent application Ser. No. 08/941,871, entitled "Screening Method for a Single Chip Multiprocessor"; U.S. patent application Ser. No. 08/900,896, entitled "Managing Interpreter Cofunctions on Multiprocessor-Based Printer"; and U.S. patent application Ser. No. 08/956,402, entitled "Reduced Instruction Processing on a Multiprocessor".

BACKGROUND OF THE INVENTION

Modern electrophotographic ("EP") printers use some sort of processor to interpret a program representing the image to be printed. The program is written in some sort of graphical description language, and the interpretation involves conversion of the program into an intermediate format, such as a display list. This display list is subsequently used to create a bitmap, which determines a pattern of light. In a typical EP printer, this pattern of light exposes a photosensitive drum. The exposure results in a charge pattern on the drum. The drum rotates past a toner dispenser and attracts toner particles to the drum's surface corresponding to the charge pattern. The drum transfers the toner to a print medium such as a piece of paper. The toner is fused to the paper, and the paper exits the printer.

The exposure unit that provides the pattern of light for exposing the drum can be comprised of a laser-scanning device or a spatial light modulator. Spatial light modulators are becoming the technology of choice for full-color, high-resolution printing at increasingly faster speeds. As printer hardware improves, methods are needed for providing faster processing, i.e., the interpretation of graphical description programming to bitmap data.

Some recently developed printers use "multiprocessors", which use a master processor and at least one subprocessor. Typically, a number of subprocessors operate in parallel. Multiprocessors often have a limited instruction cache size and the cost of instruction cache misses is high.

SUMMARY OF THE INVENTION

One aspect of the invention is a processing unit for a printer, which processes a display list representing an image to be printed. A master processor partitions the display list into sublists, each sublist representing a different portion of the image. It then distributes the sublists to parallel processors such that each parallel processor receives a different sublist. The parallel processor executes the sublists simultaneously, thereby creating bitmapped data. Each parallel processor interprets its sublist by successively reading display list elements and calling the rasterizing primitives represented by the display list elements. During execution of each current rasterizing primitive, the parallel processor determines whether the next display list element calls the same primitive. If so, execution of the current rasterizing primitive is repeated without exiting that primitive.

An advantage of the invention is that part of display list interpretation process is distributed to the rasterizing primitive processes. In other words, for successive display list elements of the same type, control stays with the rasterizing primitive. This reduces swapping of code segments between the interpreter and rasterizing processes, thereby avoiding instruction cache misses. The time savings is significant because typical display lists frequently have sequences of similar elements.

DETAILED DESCRIPTION OF THE INVENTION

For purposes of example, the following description is in terms of printer systems that use a spatial light modulator (SLM) to expose a photosensitive drum. The specific SLM device is a digital micro-mirror device (DMD). However, the same concepts could apply to printer systems that use other types of exposure systems, such as scanned laser exposure systems, and that use other types of transfer modes.

As explained below, the invention is directed to the printer's processing unit. In one embodiment, the processing unit has a master processor and a number of parallel processors. The master processor receives programming, such as a program in a page description language, and converts the program into a display list. The master processor then partitions the display list into sublists, which it delivers to one or more of the parallel processors. The parallel processors simultaneously interpret their respective sublists to provide bitmapped data.

To interpret its sublist, a parallel processor successively reads display list elements, and calls the rasterizing primitives represented by them. Before exiting a primitive, the parallel processor reads the next display list element to determine if it will call the same primitive. If so, the parallel processor simply repeats execution of the primitive without exiting. After processing all display list elements, a parallel processor informs the master processor when it is ready for a next sublist. In this manner, the parallel processors continue processing sublists until all sublists of the image are processed.

In a very general sense, both the master processor and the parallel processors run "interpreters", with the master processor being programmed to convert high level programming to an intermediate format, such as a display list, and the parallel processors being programmed to convert the display list into bitmapped data. The process of converting higher level programming to bitmapped data is also sometimes referred to as "scan conversion", a term which has been carried over to SLM-based printers even though they do not scan a beam of light. The process may also be referred to as "rasterization" or "rendering" the image, or "raster image processing". The "bitmap" is the representation of the image on a pixel-by-pixel basis, and may use grayscale or color values for each pixel. In the case of an SLM, the exposure module may include hardware for converting the bitmapped data into binary exposure data.

Figure 1:
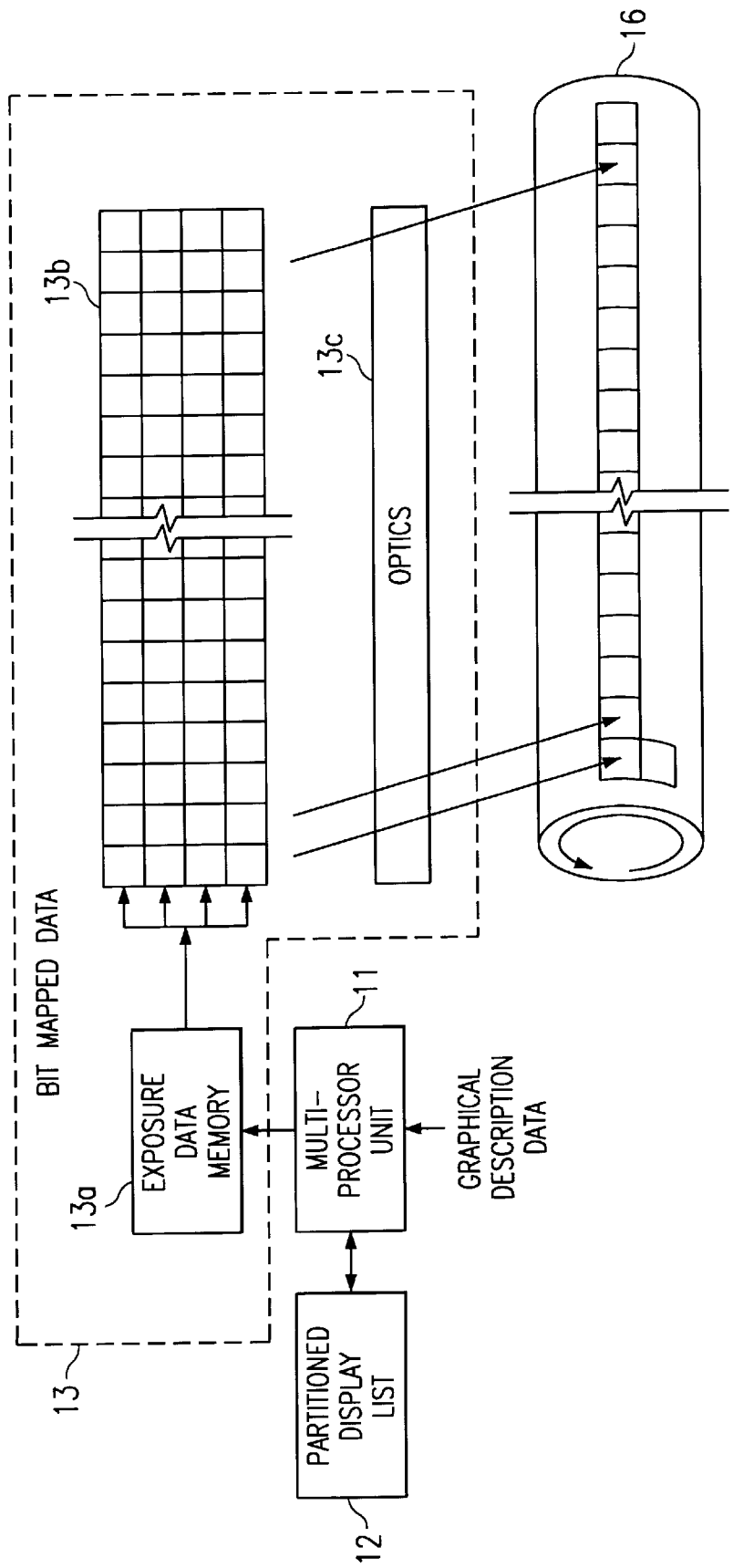
FIG. 1 illustrates portions of an electrophotographic printer, having a multiprocessor unit in accordance with the invention.

FIG. 1 illustrates portions of a printer system relevant to the invention, namely a multiprocessor unit (MPU) 11, a display list memory 12, an exposure unit 13 having a bitmap memory 13a, an SLM 13b, and optics 13c, and a photosensitive drum 16. MPU 11 is configured and programmed in accordance with the present invention, as described below.

The basic structure and operation of a suitable SLM-based exposure unit 13 and drum 16 are known in the art of electrophotographic printing. Basically, the exposure of drum 16 is accomplished with SLM 13b, which has an array of light-reflecting or light-generating elements. As stated above, in the example of this description, the SLM is a DMD, which has an array of light-reflecting micromirrors. Each micromirror is electronically controlled to tilt to an on or off position to form an image. Grayscale images are achieved by modulating the intensity, the duration, or the spot size of the exposure.

An example of a printer system, having a DMD-based exposure unit, with which the invention may be used, is described in U.S. Pat. No. 5,041,851, entitled "Spatial Light Modulator Printer and Method of Operation", to W. E. Nelson. Various methods of operating an SLM to provide grayscale images are described in U.S. Pat. No. 5,461,410, entitled "Gray Scale Printing Using Spatial Light Modulators", to J. M. Florence, et al., and in U.S. Pat. No. 5,461,411, entitled "Process and Architecture for Digital Micromirror Printer", to V. Venkateswar, et al. Each of these patents is assigned to Texas Instruments Incorporated and each is incorporated by reference herein MPU 11 receives graphical description data for the image to be printed, such as programming in a page description language. As explained below, MPU 11 interprets the programming, and provides bitmapped data that determines which mirrors will be on or off at any given time.

For purposes of providing a simple example, SLM 13b is illustrated as having only 4 rows of light-reflecting micromirrors. In practical applications, SLM 13b may have more rows and will have many columns. A typical SLM 13 might have 1000 or more elements per row. Light from a light source (not shown) is reflected by SLM 13b onto drum 16, in accordance with the "on" or "off" state of each micromirror. This state is determined by data delivered from an exposure data memory 13a.

The image is reflected from SLM 13b and focused through an optics unit 13c. As shown in FIG. 1, light from SLM 13b falls onto drum 16, with each mirror providing light for one pixel on the image. Only one line of pixels is explicitly illustrated, it being understood that many lines of pixels are simultaneously illuminated by SLM 13b. Each pixel is either exposed or not, and thereby either charged or discharged for toner attraction. Two typical sizes for such pixels are 1/300 of an inch square and 1/600 of an inch square. The drum 16 will then rotate over the paper to be printed and the toner will be transferred from the drum 16 and fused to the paper, the line of pixels printing a line on the paper.

Figure 2:
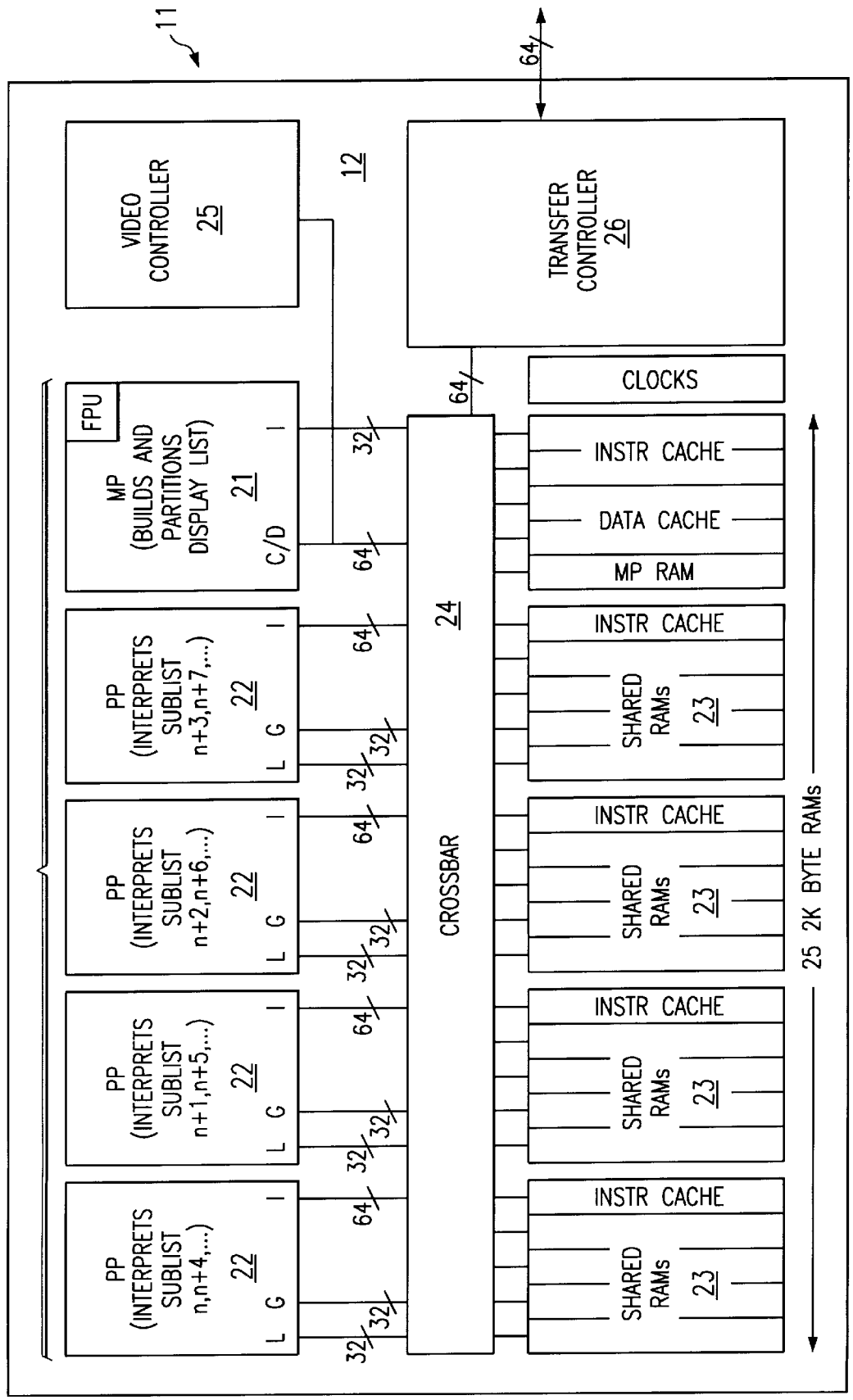
FIG. 2 illustrates the multiprocessor unit of FIG. 1.

FIG. 2 is a block diagram of MPU 11, configured for raster image processing in accordance with the invention. A suitable MPU 11 is the TMS320C80 MVP, manufactured by Texas Instruments Incorporated. Other MPUs having similar characteristics could be substituted. MPU 11 can be a single-chip device, such as is the MVP, or can be comprised of multiple components.

In addition to the structural characteristics described below, an important functional characteristic of MPU 11 is the ability to interpret a high level graphical description programming representing high-resolution full-color images at acceptable speeds. To this end, the MVP is capable of performing 2 billion RISC-like operations per second (BOPs) at 50 MHZ. The internal data memory transfer bandwidth is 2.4 Gbytes per second and the external data transfer bandwidth is 400 Mbytes per second.

MPU 12 has a master processor 21, a number of parallel processors 22, and RAM (random access memory) 23. All processors 21 and 22 are programmable. The processors 21 and 22 access RAM 23 via a crossbar switch 24. The crossbar switch 24 interconnects processors 21 and 22 in a manner such that different combinations of memory arrangements can be achieved as necessary for the particular operation. In addition to managing memory access to RAM 23, the crossbar switch 24 permits command words to be sent for inter-processor communication.

The master processor 21 is a 32-bit RISC (reduced instruction set computer) general purpose processor with a floating point hardware unit (FPU). It has an instruction (I) port to access an instruction cache in RAM 23. It coordinates the processing by the parallel processors 22 and communicates with other components of the printer.

The parallel processors 22 are 32-bit fixed-point graphics and signal processors. Each parallel processor 22 has a global (G) and a local (L) port to access RAM 23, and an instruction (I) port to access an instruction cache in RAM 23. Each parallel processor 22 has two address generators, a three-input ALU, and a clock multiplier, all controlled with 64-bit instructions. The parallel processors 22 use a 64-bit instruction operation code. The instruction set is described primarily as an assembly language.

Transfer controller 26 is a gateway to off-chip memory. It is a direct memory access device, used for cache servicing and transferring blocks of data on or off multiprocessor unit 12.

RAM 23 is 50K bytes of single-cycle memory, divided into 25 2K-byte RAM units. Each processor 21 and 22 has one RAM unit partially dedicated to storing interrupt vectors addresses and specifying parameters to the transfer controller 26. Each parallel processor 22 has three data RAM units that any processor 21 or 22 can access as shared memory. Each parallel processor 22 has one instruction cache RAM unit and the master processor 21 has two instruction cache RAM units. These RAMs are managed by an instruction cache controller in each processor. The master processor 21 also has two RAM units for data, managed by a data cache controller.

Further details describing the MVP are set out in U.S. Pat. No. 5,212,777, entitled "Multi-Processor Reconfigurable in Single Instruction Multiple Data (SIMD) and Multiple Instruction Multiple Data (MIMD) Modes and Method of Operation", assigned to Texas Instruments Incorporated. Additional information is available in various MVP *User's Guides* (1995), published by and available from Texas Instruments Incorporated. These documents are incorporated by reference herein.

In operation, master processor 21 receives a program representing an image to be rendered. If the program is not already in display list form, master processor 21 interprets the program to build a display list. This display list is a list of elements, each having an operation code with one or more parameters. The operation codes call the rasterizing primitives that will be used to render the image. For example, an operation code might call a primitive that builds a trapezoid, with the parameters specifying the dimensions. In the case of the MVP MPU 11., the primitives are written in assembly language.

In the example of this description, master processor 21 partitions the display list into sublists. Each sublist represents a portion of the image, such as a block or a strip. U.S. patent application Ser. No. 60/024,795 (Atty Dkt No. TI-19972), entitled "Embedded Display List Interpreter for Multiprocessor-Based Printer", referenced above and incorporated by reference herein, describes how a display list is partitioned by dividing an image into "bands".

Parallel processors 22 operate simultaneously, each interpreting a different sublist. Each parallel processor 22 is programmed to run its own interpreter. Typically, the interpreter is set up as a primitive table interpreter. Each parallel processor 22 successively reads the elements of its sublist. As the parallel processor 22 reads the operation code of each element, it reads the associated parameters into a parameter RAM 23. Once the parameter transfer has been made, the operation code is used to access the appropriate operation code body for that function. More specifically, each operation code represents an entry point to a rasterizing primitive that will be executed to render the image in bitmapped form. The entry point enables the parallel processors 22 to vector to the location in memory that stores the code.

Figure 3:
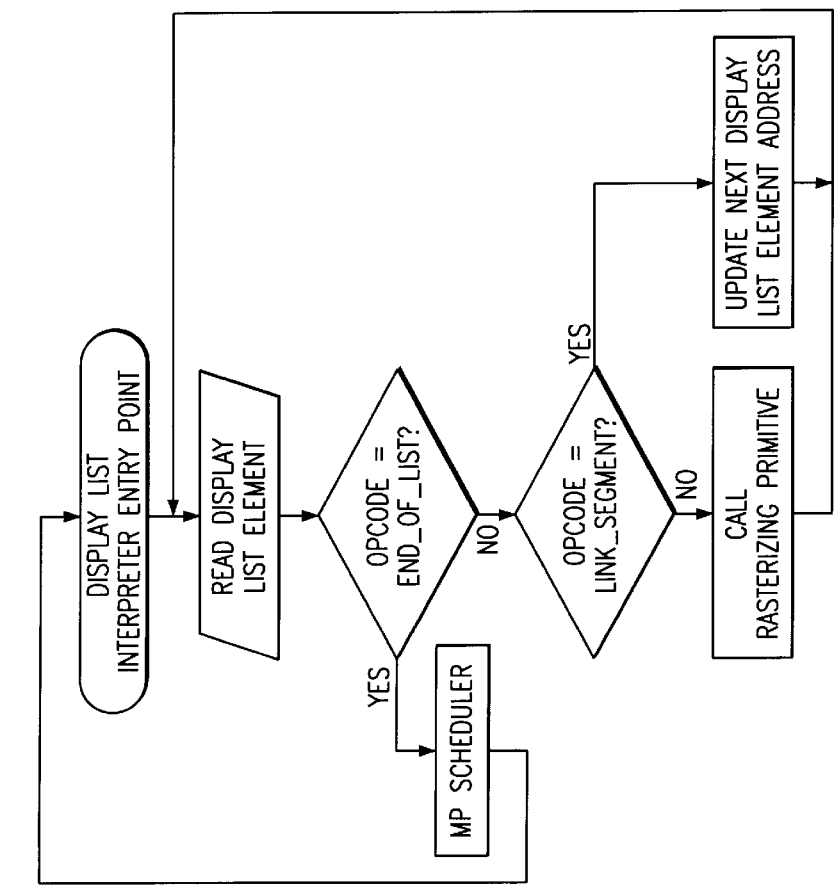
FIG. 3 illustrates the process of interpreting a display list, performed by the parallel processors of FIG. 2.

FIG. 3 illustrates the basic steps followed by a parallel processor 22 during the process of the preceding paragraph. The parallel processor 22 reads whatever display list element is currently addressed. If the operation code indicates the end-of-list, the parallel processor 22 informs the master processor 21 that it is finished. Also, if the sublist is sufficiently long to have been segmented in memory and the operation code is a link-segment operation code indicating the end of the segment, the parallel processor 22 obtains the address for the next segment. If the operation code is not an end-of-list or link-segment operation code, the parallel processor 22 calls the rasterizing primitive.

Figure 4:
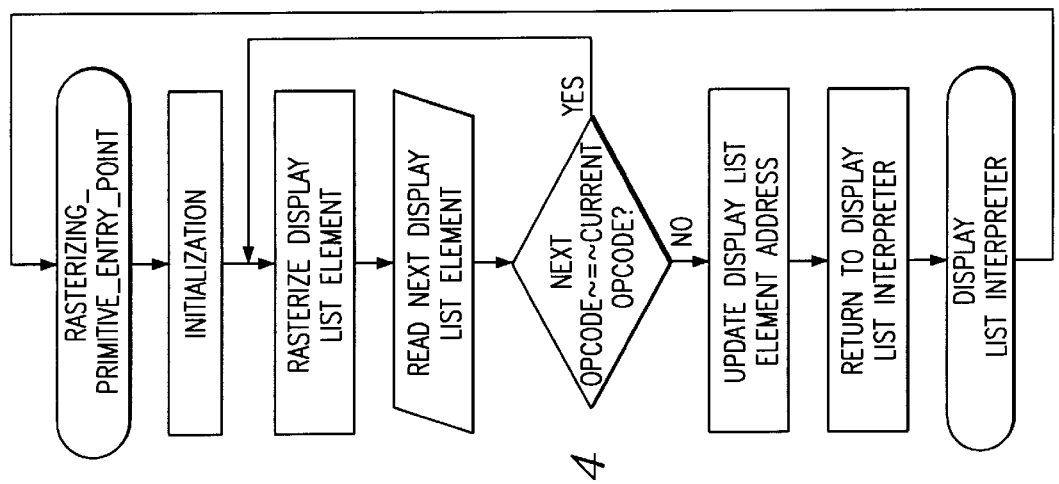
FIG. 4 illustrates the process of executing a rasterizing primitive, called during the display list interpretation of FIG. 3.

FIG. 4 illustrates the basic steps followed by the parallel processor 22 during execution of the rasterizing primitive. As explained above in connection with FIG. 3, this primitive was called by an operation code, which is now the current operation code. After appropriate initialization, the parallel processor 22 performs the rasterization task. For parameters, the primitive interfaces to a sequential block of parameters in RAM 23. It receives a pointer to the head of that block in an address register or as an entry in a stack. The primitive then reads the parameters and assigns them to registers as required. The result of the execution of the primitive is bitmap data corresponding to the operation code.

Before exiting the primitive and returning processing control to the display list interpretation process, the parallel processor 21 reads the next display list element. It determines whether the operation code of that display list element is the same as the current operation code. If so, the parallel processor 22 repeats the execution of the primitive. If not, it updates the display list element address. It then returns processing control to the display list interpreter, which accesses the next element in the sublist and repeats the processes of FIGS. 3 and 4.

The process of FIGS. 3 and 4, that is, the display list and interpretation process (which includes calling primitives and executing them), are repeated until the sublist is exhausted, at which time the display list interpretation process notifies master processor 21 that the parallel processor 22 is ready for another sublist, or to perform any other task it may be assigned.

The above description is directed to a multiprocessor having multiple subprocessors that perform display list interpretation and rasterizing in parallel. Thus, the subprocessors are "parallel processors". This type of multiprocessor often has limited instruction caches, making it more susceptible to instruction caches misses. However, the invention is useful for any multiprocessor having at least a master processor that builds and schedules a display list for interpretation by at least one subprocessor. As described above, before exiting each current rasterizing primitive, the subprocessor will determine if the current rasterizing primitive can be repeated.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A processing unit for a printer, operable to process a display list representing an image to be printed, comprising:
   a master processor operable to provide at least part of said display list to at least one subprocessor; and
   said at least one subprocessor operable to interpret said display list by reading operation codes of said display list and executing rasterizing primitives called by said operation codes, determining during execution of a current rasterizing primitive whether the next rasterizing primitive to be executed is the same as said current rasterizing primitive, and, if so, re-executing said current rasterizing primitive from said subprocessor.

2. The processing unit of claim 1, wherein said master processor and subprocessor are components of a single multiprocessor device.

3. The processing unit of claim 2, wherein said master processor and said subprocessor are connected via a crossbar switch.

4. The processing unit of claim 2, wherein said master processor and said subprocessor have shared random access memory on said device.

5. The processing unit of claim 1, wherein said subprocessor is one of a number of parallel processors.

6. The processing unit of claim 1, further comprising random access memory associated with said subprocessor for storing parameters of said display list.

7. A processing unit for a printer, operable to process a display list representing an image to be printed, comprising:
   a master processor operable to partition said display list into sublists, each of said sublists representing a different portion of said image, and to distribute said sublists to a plurality of parallel processors; and
   said plurality of parallel processors, each parallel processor operable to interpret one of said sublists by reading operation codes of said display list and executing rasterizing primitives called by said operation codes, determining during execution of a current rasterizing primitive whether the next rasterizing primitive to be executed by a said parallel processor is the same as the current rasterizing primitive therein, and, if so, re-executing said current rasterizing primitive from said parallel processor.

8. The processing unit of claim 7, wherein said master processor and said parallel processors are components of a single multiprocessor device.

9. The processing unit of claim 8, wherein said master processors and said parallel processor are connected via a crossbar switch.

10. The processing unit of claim 8, wherein said master processor and said parallel processors have shared random access memory on said device.

11. The processing unit of claim 7, further comprising random access memory associated with each of said parallel processors for storing parameters of said display list.

12. A method of using a multiprocessor to process a display list, which is a list of operation codes and parameters representing an image to be printed, comprising the steps of:

providing a master processor and a subprocessor;

delivering at least part of said display list to said subprocessor from said master processor; and interpreting said display list in said subprocessor, executing in said subprocessor rasterizing primitives called by operation codes of said display list and during execution of a current rasterizing primitive, determining in said subprocessor whether the next rasterizing primitive to be called is the same as the current rasterizing primitive in said subprocessor, and, if so, re-executing said current rasterizing primitive from said subprocessor.

13. The method of claim 12, wherein said subprocessor is one of a number of parallel processors, and said interpreting step is performed concurrently on portions of said display list by said parallel processors.

14. The method of claim 12, further comprising the step of updating an address of a next element of said display list during said interpreting step, if said next rasterizing primitive is the same as said current rasterizing primitive.

15. A method of using a multiprocessor to process a display list, which is a list of operation codes and parameters representing an image to be printed, comprising the steps of:

providing a master processor and a plurality of parallel processors;

partitioning said display list into sublists, each of said sublists representing a different portion of said image, by said master processor;

distributing said sublists to said plurality of parallel processors, each of said parallel processors receiving a different one of said sublists from said master processor;

simultaneously interpreting said sublists in said parallel processors, executing in said parallel processors rasterizing primitives called by operation codes of said sublists and, during execution of a current rasterizing primitive, said parallel processors determining whether the next rasterizing primitive to be called is the same as said current rasterizing primitive, and if so, re-execute said current rasterizing primitive from said parallel processors; and repeating said distributing and interpreted steps until all of said sublists of said image have been interpreted.

16. The method of claim 15, further comprising the step of updating an address of a next element of said display list during said interpreting step, if said next rasterizing primitive is the same as said current rasterizing primitive.

* * * * *